(12) United States Patent
Caudill (10) Patent No.: US 8,803,369 B1
(45) Date of Patent: Aug. 12, 2014

(54) AUTOMATIC ISOLATION SWITCH FOR POWER TRANSFER WITH EMERGENCY ISOLATION CONTROL

(76) Inventor: Willie Sam Caudill, Tobaccoville, NC (US)

( * ) Notice: Subject to any disclaimer, the term of this patent is extended or adjusted under 35 U.S.C. 154(b) by 502 days.

(21) Appl. No.: 13/233,493

(22) Filed: Sep. 15, 2011

Related U.S. Application Data

(63) Continuation-in-part of application No. 12/985,074, filed on Jan. 5, 2011, now abandoned.

(60) Provisional application No. 61/335,396, filed on Jan. 6, 2010.

(51) Int. Cl.
*H01H 3/00* (2006.01)

(52) U.S. Cl.
USPC .............................................. 307/139

(58) Field of Classification Search
USPC .............................................. 307/139
See application file for complete search history.

(56) References Cited

U.S. PATENT DOCUMENTS

| | | | |
|---|---|---|---|
| 385,826 A | 7/1888 | Sechrist | |
| 1,213,073 A | 1/1917 | Carr | |
| 1,557,394 A | 10/1925 | Anderson | |
| 1,561,303 A | 11/1925 | Baxter | |
| 1,609,223 A | 11/1926 | Trumbull | |
| 1,617,040 A | 2/1927 | Zimmer | |
| 1,638,828 A | 8/1927 | Carling | |
| 1,652,541 A | 12/1927 | Neil | |
| 1,664,380 A | 3/1928 | Meyers | |
| 1,795,434 A | 3/1931 | Leppert | |
| 2,479,266 A | 8/1949 | Rowe | 200/67 |
| 2,807,684 A | 9/1957 | Ayers | 200/67 |
| 3,134,877 A | 5/1964 | Ericson | |
| 3,158,701 A | 11/1964 | Nadeau | 200/50 |
| 3,246,100 A | 4/1966 | Russell | 200/92 |
| 3,369,100 A | 2/1968 | Kussy et al. | 200/172 |
| 3,432,628 A | 3/1969 | Peutz | 200/50 |
| 3,492,448 A | 1/1970 | Phillips, Jr. | 200/50 |
| 3,510,612 A | 5/1970 | Ward | 20/50 |
| 3,647,997 A | 3/1972 | Nerem | 200/50 |
| 3,654,484 A | 4/1972 | Jorgenson et al. | 307/149 |
| 3,705,280 A | 12/1972 | Harms | 200/50 |
| 3,767,872 A | 10/1973 | Whitchurch | 200/50 |
| 3,778,633 A | 12/1973 | Yazvaz | 200/50.4 |
| 3,789,169 A | 1/1974 | Yazvac | 200/50 |
| 3,801,758 A | 4/1974 | Shand et al. | 200/50.33 |
| 3,936,782 A | 2/1976 | Moakler et al. | 335/161 |
| 4,034,170 A | 7/1977 | Raabe et al. | 200/50 |
| 4,113,334 A | 9/1978 | Instone | 439/96 |
| 4,270,031 A | 5/1981 | Borona et al. | 200/50 |
| 4,510,357 A | 4/1985 | Winterbottom | 200/50 |
| 4,590,387 A | 5/1986 | Yoshida et al. | 307/64 |

(Continued)

OTHER PUBLICATIONS

"2005 NEC Changes Summary Articles 700 through 702," National Electrical Code Internet Connection.

(Continued)

*Primary Examiner* — Robert L. DeBeradinis
(74) *Attorney, Agent, or Firm* — MacCord Mason PLLC (57) ABSTRACT

A power system including an improved automatic power transfer device having an emergency isolation control that prevents a common load from at once being powered by a main and auxiliary power source, and eliminates any possibility of back feeding the main power source from the auxiliary power source.

12 Claims, 8 Drawing Sheets

(56) References Cited

U.S. PATENT DOCUMENTS

| | | | | |
|---|---|---|---|---|
| 4,724,512 A | 2/1988 | Bischof et al. | | 361/357 |
| 4,760,278 A | 7/1988 | Thomson | | 307/64 |
| 4,791,255 A | 12/1988 | Eliezer | | 200/144 |
| 4,827,089 A | 5/1989 | Morris et al. | | 200/50 |
| 4,902,859 A | 2/1990 | Witzmann et al. | | 200/50 |
| 4,924,041 A | 5/1990 | Yee | | 200/50 |
| 4,999,598 A | 3/1991 | Jannesari et al. | | 335/122 |
| 5,008,499 A | 4/1991 | Yee et al. | | 200/50 |
| 5,397,868 A | 3/1995 | Smith et al. | | 200/18 |
| 5,422,453 A | 6/1995 | Smith et al. | | 200/329 |
| 5,648,646 A | 7/1997 | Flegel | | 200/50.32 |
| 5,725,085 A | 3/1998 | Seymour et al. | | 200/50.33 |
| 5,761,027 A | 6/1998 | Flegel | | 361/664 |
| 5,790,369 A | 8/1998 | Sitler | | 361/643 |
| 5,814,777 A | 9/1998 | Green et al. | | 200/50.33 |
| 5,914,467 A | 6/1999 | Jonas et al. | | 200/1 |
| 5,977,492 A | 11/1999 | Taylor et al. | | 200/50.32 |
| 6,069,328 A | 5/2000 | Oravetz et al. | | 200/50.33 |
| 6,096,986 A | 8/2000 | Flegel | | 200/50.33 |
| 6,169,340 B1 | 1/2001 | Jones | | 307/64 |
| 6,180,897 B1 | 1/2001 | Montague et al. | | 200/50.35 |
| 6,184,595 B1 | 2/2001 | Flegel, Jr. | | 307/114 |
| 6,521,849 B1 | 2/2003 | Flegel | | 200/50.32 |
| 6,538,223 B1 | 3/2003 | Yoshida et al. | | 200/401 |
| 6,541,719 B1 | 4/2003 | Powell | | 200/50.32 |
| 6,570,269 B2 | 5/2003 | McMillan et al. | | 307/4 |
| 6,621,689 B1 | 9/2003 | Flegel | | 361/631 |
| 6,680,445 B1 | 1/2004 | Oravetz et al. | | 200/50.33 |
| 6,815,623 B1 | 11/2004 | Holland | | 200/50.32 |
| D499,700 S | 12/2004 | Raabe et al. | | D13/50.32 |
| 6,861,596 B2 | 3/2005 | Schnackenbert | | 200/43.01 |
| 7,005,590 B1 | 2/2006 | Willis | | 200/50.32 |
| 7,268,308 B1 | 9/2007 | Caudill et al. | | 200/50.35 |
| 2010/0038966 A1* | 2/2010 | Espeut, Jr. | | 307/68 |

OTHER PUBLICATIONS

"How to Operate a Portable Generator Safely," North Carolina's Elec. Cooperatives—admitted prior art.

"Guide to Installing a Standby Backup Generator," Dakota Electric Ass'n.—admitted prior art.

"Safely Installing Your Standby Electric Generator," Flathead Electric Cooperative—admitted prior art.

\* cited by examiner

AUTOMATIC ISOLATION SWITCH FOR POWER TRANSFER WITH EMERGENCY ISOLATION CONTROL

This application claims the benefit of U.S. Provisional Application No. 61/335,396 filed Jan. 6, 2010 and is a Continuation-In-Part of U.S. application Ser. No. 12/985,074.

The present invention relates generally to a power system including an improved automatic power transfer device and, more particularly, to an automatic transfer device having an emergency isolation control that prevents a common load from at once being powered by a main and auxiliary power source, and eliminates any possibility of back feeding the main power source from the auxiliary power source.

Reliance on electrical power in homes and industry causes power outages resulting from breakdowns in electrical utility equipment to become aggravating and oftentimes costly to varying degrees. The frequency of disruptions in utility electrical service has resulted in the popularity of standby generating equipment to supply at least critical load circuits. To accommodate these alternative electrical sources supplying common electrical load circuits, a power transfer switch is usually used. Such a transfer switch is normally conditioned to connect the utility source to the common load circuits, while maintaining generating equipment disconnected on standby.

Upon the occurrence of a power outage, the transfer switch is thrown, either automatically or manually, to first disconnect the utility or main source and then connect the standby source or generator to the common load circuits. Obviously, precaution must be taken to ensure that the two sources can never be simultaneously connected to the common load circuits. In addition, where an auxiliary power source feeds an existing load center normally powered by a utility, the possibility of back feeding the utility with a generator through a common or neutral return conductor from the utility may exist, posing a safety hazard to utility workers dispatched to repair damaged power lines. Thus, there is a need for a power system that includes a power transfer device that prevents a common load from simultaneously being powered by a main and auxiliary power source, and eliminates any possibility of back feeding the main power source from the auxiliary power source.

In U.S. Pat. No. 7,268,308, which is herein incorporated by reference in its entirety and for which the invention has received UL listing, an automatic isolation switch makes use of an isolation switch for power transfer. However, Applicant believes there remains a need for a more reliable and efficient device for controlling automatic switching of the isolation switch. Furthermore, Applicant believes that addition of an automatic isolation switch creates the need for a safety emergency isolation control so that power supply may be completely shut off during emergency situations.

SUMMARY OF THE INVENTION

The present invention is directed to a power system including an improved automatic power transfer device.

In one embodiment, the automatic isolation switch makes use of an alternating pivotal fulcrum to enable a controlled time delay during the switching from one source of power to the other. A safety emergency isolation control is added to provide a safe means to isolate the load center during emergencies and to aid in saving lives and reduce property loss from emergency situations, such as electrical fires. The control may activate an alert system to aid in reducing response time of rescue or emergency personnel.

These and other aspects of the present invention will become apparent to those skilled in the art after a reading of the following description of the preferred embodiment when considered with the drawings.

BRIEF DESCRIPTION OF THE DRAWINGS

FIG. 2 A is a front view of a power transfer device constructed according to an embodiment of the invention where power is being supplied by a utility source.

FIG. 2 B is a front view of a power transfer device constructed according to an embodiment of the invention where power is not being supplied from a utility or a backup supply.

FIG. 2 C is a front view of a power transfer device constructed according to an embodiment of the invention where power is being supplied from a backup source.

FIG. 3 A is a detailed view of a power transfer device constructed according to an embodiment of the invention where power is being supplied by a utility source.

FIG. 3B is a detailed view of a power transfer device constructed according to an embodiment of the invention where power is not being supplied from a utility or a backup supply.

FIG. 3C is a detailed view of a power transfer device constructed according to an embodiment of the invention where power is being supplied from a backup source.

DESCRIPTION OF THE PREFERRED EMBODIMENTS

In the following description, like reference characters designate like or corresponding parts throughout the several views. Referring now to the drawings in general, it will be understood that the illustrations are for the purpose of describing a preferred embodiment of the invention and are not intended to limit the invention. Those of ordinary skill will recognize that the invention is capable of various and numerous embodiments.

Figure 1:
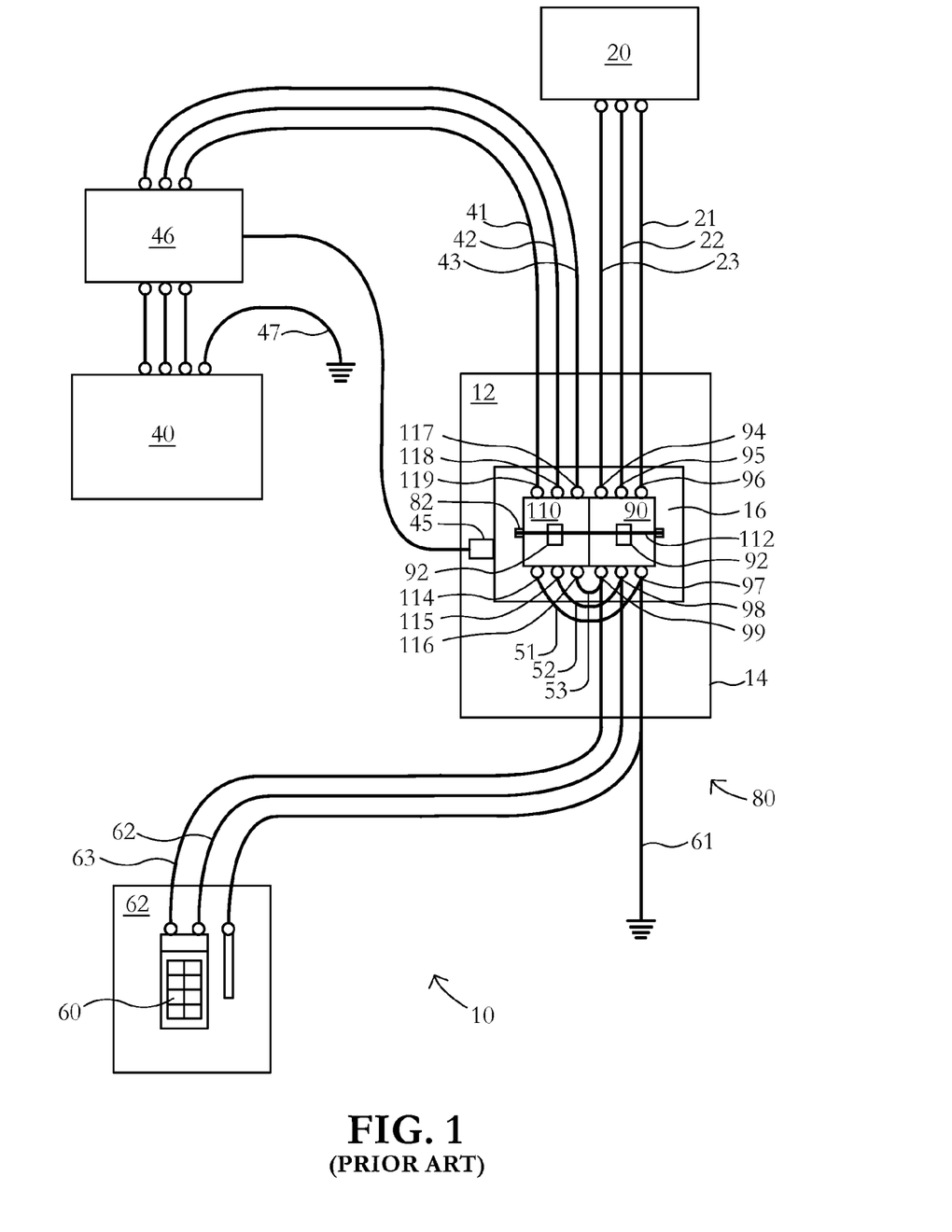
FIG. 1 is a schematic view of a power system according to an embodiment of the invention.

FIG. 1 shows a power system 10 constructed according to one embodiment of the invention. The power system 10 includes an electrical load 60 serviced by a load center 62 to which power is supplied by either a main 20 or auxiliary power source 40. The load center 62 typically includes a box with a plurality of circuit breakers taking currents off an input bus and distributing the current to individual circuits, such as lights, stores, receptacles, etc. The main power source 20 can be a utility power source and the auxiliary power source 40 can be a stand by generator 40, for example, having a main disconnect 46 between it and the electrical load 60. The power system 10 also includes a power transfer device 80 for switching the electrical load 60 between the main 20 and auxiliary power source 40.

FIG. 1 also shows the construction of an embodiment of the power transfer device 80 that takes the form of a pair of adjacent three pole circuit breakers 90 and 110 affixed to a common mounting pan 16, which is in turn mounted to the back wall 12 of a housing 14 at least partially enclosing the power transfer device 80. In an alternative embodiment, the breakers 90 and 110 can be mounted to a housing in common with the load center 62 connecting the electrical load 60. Each of the breakers 90 and 110 includes a switch 92 movable towards one of two opposing ends of the breaker 90 or 110 to its ON position, and toward the opposite end to an OFF position. The breakers 90 and 110 are disposed alongside one another with their respective ON and OFF ends reversed such that moving both switches 92 in the same direction moves one switch 92 to its ON position and the switch 92 of the adjacent breaker 90 or 110 to its OFF position. The breakers 90 and 110 can be UL approved or newly fabricated and should meet or exceed the current carrying requirements of the load center 62.

In FIG. 1, one end of the circuit breaker 90 to the right includes three line terminals 94, 95, and 96, each corresponding to a load terminal 97, 98, or 99 at the opposite end of the breaker 90. The adjacent circuit breaker 110 likewise includes three load terminals 114, 115, and 116 at one end, with each of the three corresponding to an opposing line terminal 117, 118 or 119 at the opposite end of the breaker 110. The power transfer device 80 includes a coupler 82.

The circuit breakers 90 and 110 can be mounted such that the switches 92 are slightly offset (not shown in FIG. 1) to assure a make-before-break power transfer device 80. In the prior art, a solenoid powered by the auxiliary power source, such as 40, has been used to turn switches, by a switching device 112, to ON and the adjacent switch 92 OFF. However, Applicant realized that this configuration may not provide enough force to consistently and continually flip switch device 112 and switches 92. In one embodiment, the switching device may need to accommodate approximately a three inch range of motion for switching the switches 92 alternately from the ON to the OFF position. Applicant realized that a solenoid may not provide such a range of motion to the switching device. Failure to turn the switches in a power out situation defeats the purpose of having an automatic power transfer device and essentially returns the device to manual power transfer. The invention is directed to these and other problems.

Shown in FIG. 1, two power cables 22 and 23 (typically 110V), from the main power source 20 are connected to two of the line terminals 94 and 95 and two corresponding load terminals 99 and 98 of one of the circuit breaker 90 such that when the switch 92 is ON, the cables 22 and 23 provide power through the breaker 90 to the electrical load 60 at the load center 62. A ground conductor 21 is connected to the other line terminal 96 and load terminal 97 of the breaker 90, and grounded on the load side of the breaker 90. The auxiliary power source 40 also includes a grounded line 47 that can be joined with the ground 61 connected to the terminal 97 of the breaker 90. The ground conductor 21 from the main power source 20 is not connected to the electrical load 60. Thus, when the breaker 90 is open or OFF, the main power source 20 is completely isolated from the electrical load 60, and there is no possibility of back feeding the main power source 20 from the auxiliary power source 40 through the neutral or common return conductor.

Two insulated power cables 42 and 43 and a ground conductor 41 from the auxiliary power source 40 are connected to the line terminals 117, 118 and 119 of the adjacent circuit breaker 110. Three cables 51, 52 and 53 connect the line terminals 114, 115 and 116 of this breaker 110 to the load terminals 97, 98 and 99 of the circuit breaker 90, respectively. These are in common with power cables 62 and 63 to the electrical load 60 and the grounded line 61 such that the auxiliary power source 40 and the main power source 20 can alternatively supply the electrical load 60 through the load center 62, depending on the position of the coupler 82, and thus the switches 92 of the circuit breakers 90 and 110.

As can be seen in an embodiment of the invention, as shown in FIGS. 2A, 2B and 2C, a mechanical device is constructed to have leverage control and is powered by a mechanical auger drive 122 that may be, in turn, powered, for example, by an electrical motor 120. The mechanical motor drive 120 may be powered by either the utility and/or the backup power supply or powered by a solar energy supply. The auger drive 122 directs the movement of an alternating pivotal fulcrum 124 positioned to consistently move the switches into any of three positions while maintaining total isolation between the sources of power.

Figure 2:
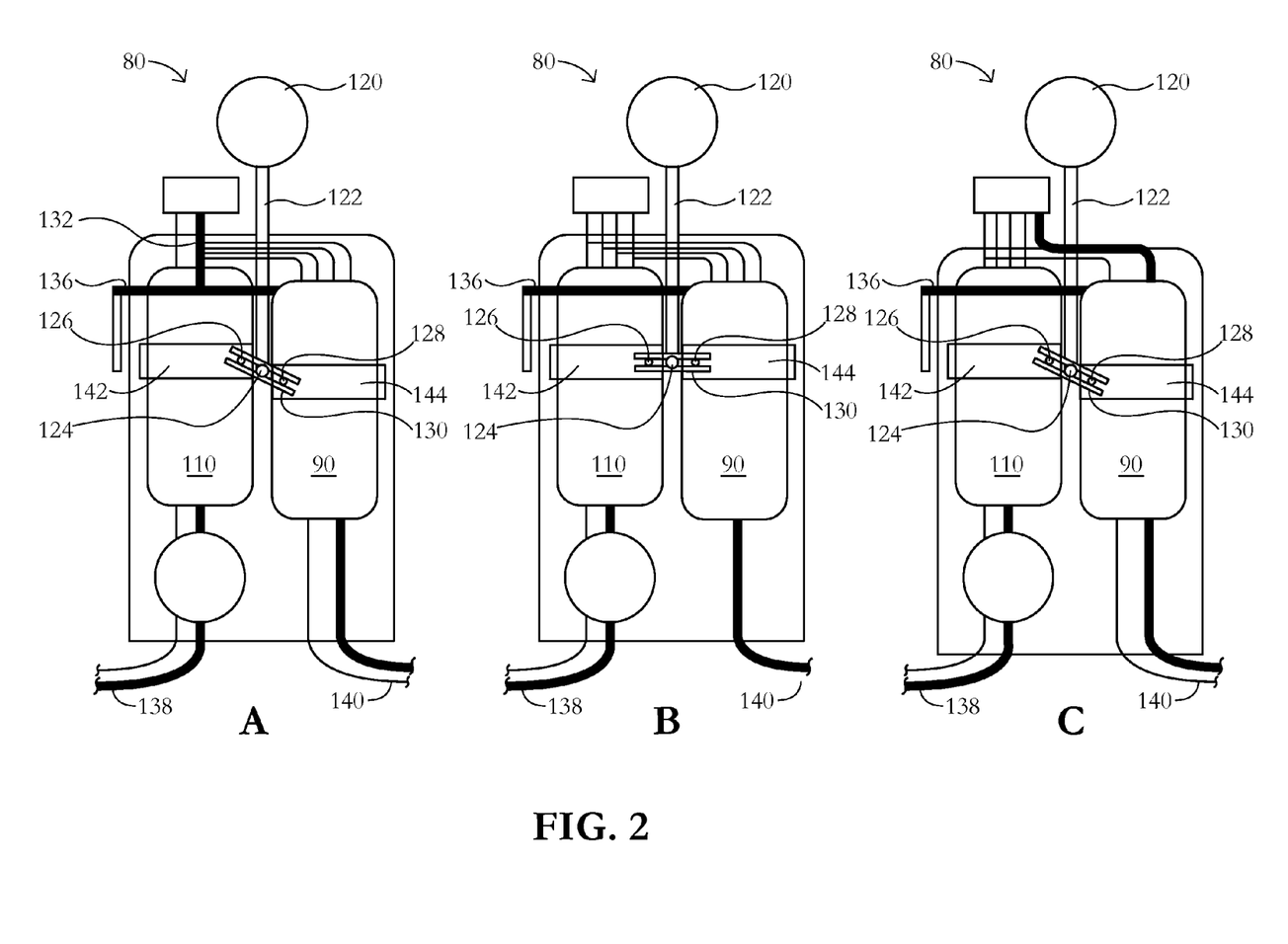
Figure 5:
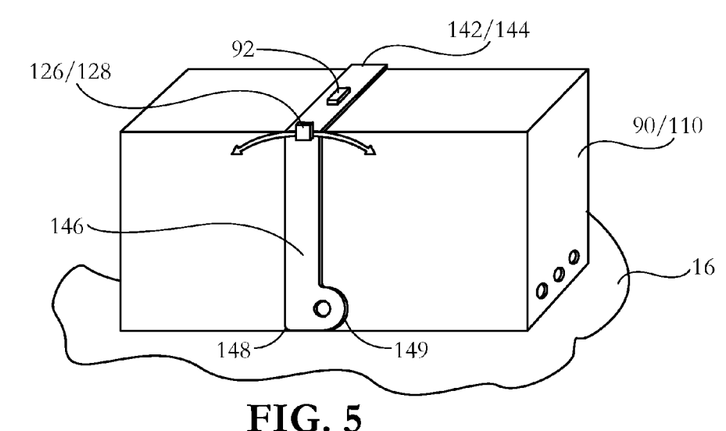
FIG. 5 is side view of an automatic isolation switch control according to an embodiment of the invention.
Figure 6:
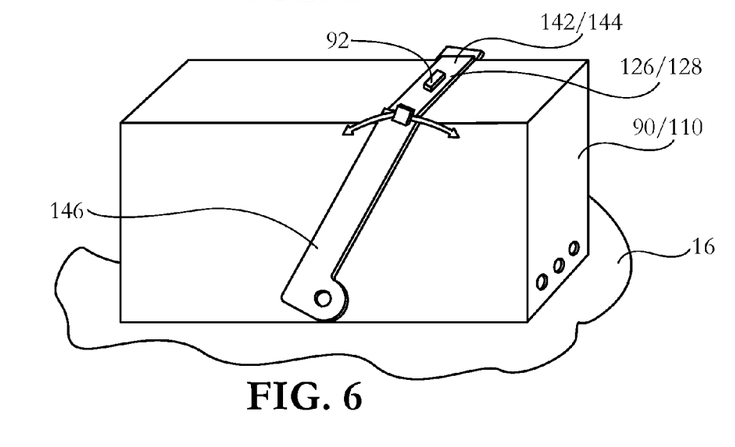
FIG. 6 is a side view of an automatic isolation switch control according to an embodiment of the invention.

FIGS. 2 and 3A, B and C, shows a front perspective view of the circuit power transfer device 80 where the coupler 82 includes extensions 142, 144 which may be integral or separate attached pieces. Auger drive 122 powers an alternating pivotal fulcrum 124 that attaches to bars 130 that extend between circuit breakers 90 and 110. The bars 130 distally contact pivots 126 and 128 that are attached to extensions 142, 144. Extensions 142, 144 extend laterally across the face of each of the circuit breakers 110 and 90 and can throw switches 92 found on both circuit breakers. As best seen in FIGS. 5 and 6, each extension 142, 144 also extends along the sides 146 of circuit breakers 90, 110. Sides extension 146 may be integrally formed with extensions 142, 144 or may be separate attached pieces. The side extension 146 may have an end portion pivotally mounted to each side of the breaker. The end portion of side extensions 146 are curved on one side 149 and not on the other 148 so that the portion of extension 146 that is not curved 148 creates a stop that prevents movement by the extension in that direction past a substantially perpendicular point (as seen in FIG. 5) by bearing against the mounting pan 16. Movement by the extensions 142, 144 in either direction actuates its respective switch either directly or indirectly by causing another portion of the coupler 82 (as seen in FIG. 1) to actuate the switch. The lateral side extensions 146 are reversely positioned on adjacent circuit breakers 110 and 90 so that the noncurved section 148 of the coupler is in opposing positions on circuit breaker 110 and circuit breaker 90. The opposing placement is designed so that movement of the extension is up and back to its original position against the stop 148 on one circuit breaker while being down and back to its original position against the stop 148 on the other circuit breaker.

Returning to FIGS. 2 and 3, auger drive 122 drives the pivotal fulcrum 124 with movement up or down. The fulcrum 124 is mounted on a carriage (not shown) that has internal threads so it moves when the auger 122 rotates. The bars 130, which may take a variety of shapes, including being a solid piece, pass this movement along through their connection with contact pivots 126, 128 located on the extensions 142, 144. As movement of the fulcrum 124 is directed upwardly, the extension with its rounded end 149 on the upward side, seen here on circuit breaker 110, is allowed to shift upwards and move the switch in that direction (as seen in A). The extension with the nonrounded side 148 in the upward direction, seen here on breaker 90, remains stationary as the stop prevents movement of the extension in the upward direction. When downward movement of the fulcrum 124 occurs, extension 142 that moved upward is returned to its original position (B). Further downward movement generated by the auger drive 122 causes the extension 144 with side 149 on the downward edge to move downwardly, (seen here on circuit breaker 90) shifting the corresponding switch in the same direction. The extension 142 with the nonrounded side 148 facing downwardly, seen here on breaker 110, remains stationary as the stop prevents movement of the coupler on breaker 90 in the downward direction (C). Movement up returns the coupler to its original position (B).

By way of example, the automatic isolation switch for power transfer is constructed using UL listed service entrance breakers that are positioned side by side to be able to supply the voltage and amperage required by the load center. The breaker assembly for the utility power and the breaker assembly for the alternate power are reversely positioned and controlled by an alternating traveling fulcrum with the aid of a leverage control powered a mechanical auger drive that is typically powered by an electrical motor. The function of the switch is to select the power to the load center from the utility or from the alternate power source in a safe manner while completely isolating each source from the other. A three position switch I is utilized that maintains total isolation to include all hot lines and the neutral and ground circuits with sufficient time delay during the switching process to prevent surge or spike voltage from bridging the contacts during transfer. The ability to control the delay allows refrigeration or air conditioning systems to equalize in order to prevent static lock and component damage or unit burn out.

In operation, the extensions 142, 144 slidably engage the surfaces of the breaker 90 and 110 and may serve to change the position of the switches 92 directly or indirectly by activating switching device 112. This construction permits the breakers to be either substantially laterally disposed, or slightly offset from being laterally disposed with respect to one another to provide an increased delay time in a break-before-make configuration of the breakers 90 and 110.

The automatic isolation switch for power transfer is constructed to meet the needs of the volts and amps in order to meet the needs of the load center. The breakers being reversely positioned and controlled by the traveling pivotal fulcrum are able to consistently move the switch to any of three positions of the switch using a 12 volt electric motor 120 and mechanical auger 122.

Figure 3:
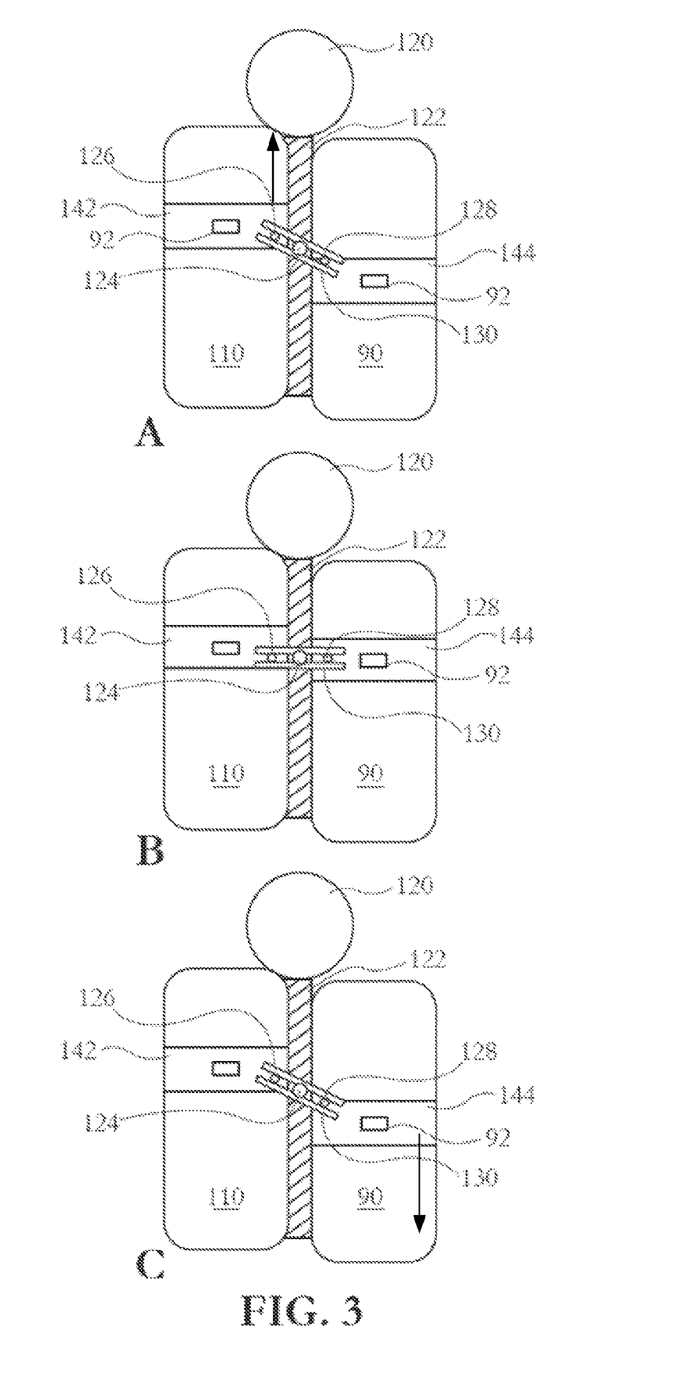

The example below explains the three alternate positions (A, B and C as seen in FIGS. 2 and 3) of the switches on the breakers:

| | | |
|---|---|---|
| Utility Breaker | Position A | Rounded side 149 allows movement of extension, utility power to breaker |
| Alternate Power Breaker | | Nonrounded side 148 of extension against stop, isolates alternate power from breaker |
| Utility Breaker | Position B | Nonrounded side 148 of extension against stop, isolates utility power from breaker |
| Alternate Power Breaker | | Nonrounded side 148 of extension against stop, isolates alternate power from breaker |
| Utility Breaker | Position C | Nonrounded side 148 of extension against stop, isolates alternate power from breaker |
| Alternate Power Breaker | | Rounded side 149 allows movement of extension, alternate power to breaker |

To move the switch from the utility power supply 132 or A position, as seen in FIGS. 2 and 3, to the alternate power supply 134 or C position, the auger first moves the 110 switch 92 to the B position or the isolation position by means of the pivotal fulcrum 124. After a predetermined delay, the auger drive moves the 90 switch to the C position or the alternate power on position by means of the pivotal fulcrum, as seen in C. To move the switch from the alternate power, the C position, back to the utility or A position, the pivot will now be allowed on the utility assembly side 126 which was previously against its stop. The auger first moves the 90 breaker to the B position configuration first, where all power supply is isolated. After a predetermined delay, the pivot will be allowed to close the breaker 110 on the utility power supply side 126 since the alternate supply side is now against its stop.

Figure 7:
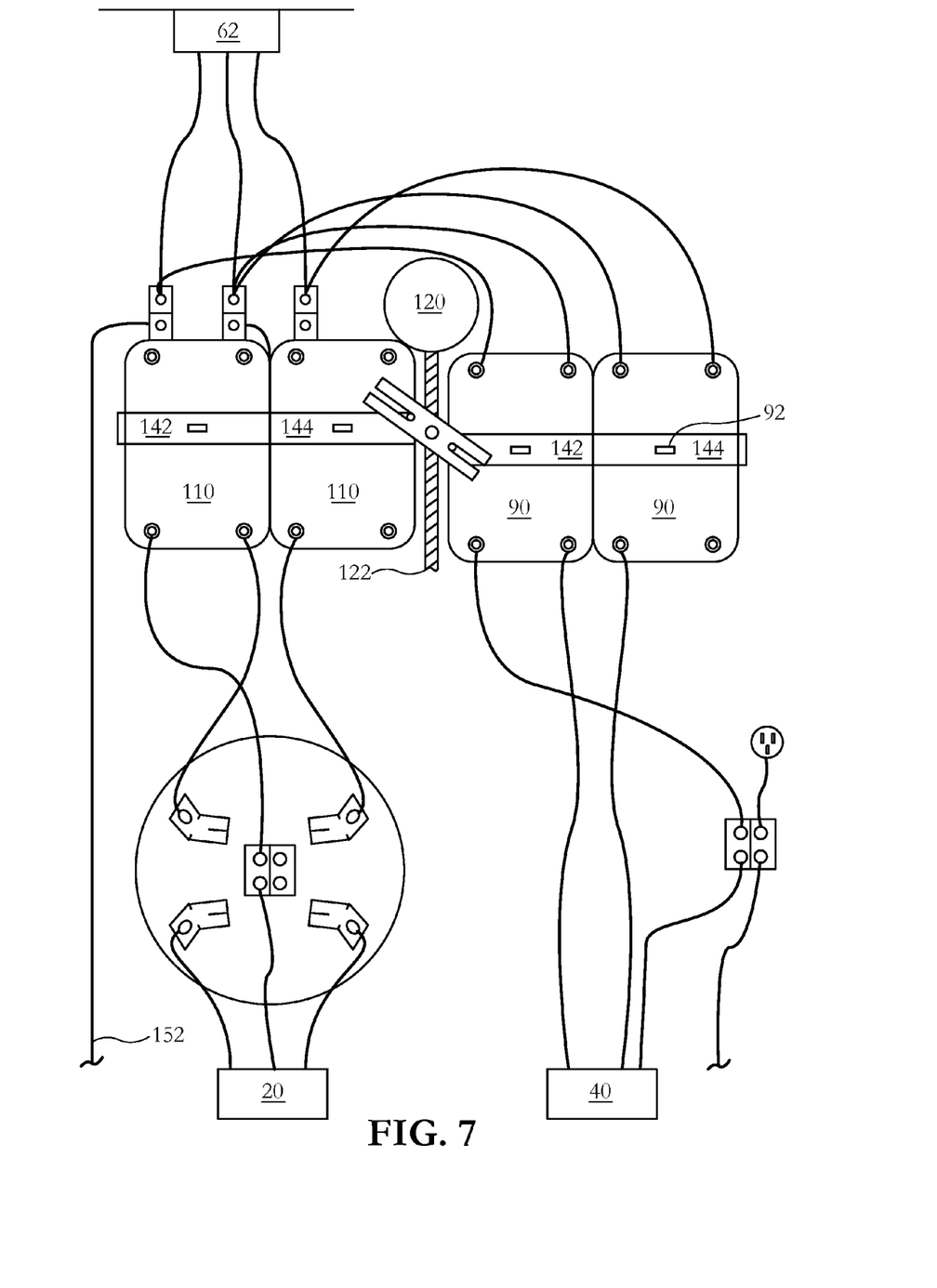
FIG. 7 is a diagram of a power system according to an embodiment of the invention where the power is being supplied by the utility.

As seen in the embodiment of FIG. 7, the invention may include a main power source 20 having power cables from the main power source connected to a terminal of one of the opposing pairs of terminals of a first switch 110 and a neutral or common cable from the main power source connected to one of the opposing pairs of terminals of the first switch. Further, there may be an auxiliary power source 40 connected by a power cable to a terminal of one of the opposing pairs of terminals of the second switch 90 and a neutral or common cable from the auxiliary power source, also connected to breaker 90. Cables may also extend from the opposing terminals of second switch 90 to the opposing loadside terminals of first switch 110. Power cables may extend from first switch 110, from the other terminal of the pair to which the power cables from the main power source 110 connect, to connect an electrical load 62. A cable grounded at one end 152 may connect to the other terminal of the pair to which the neutral cable from the main power source is connected.

Figure 8:
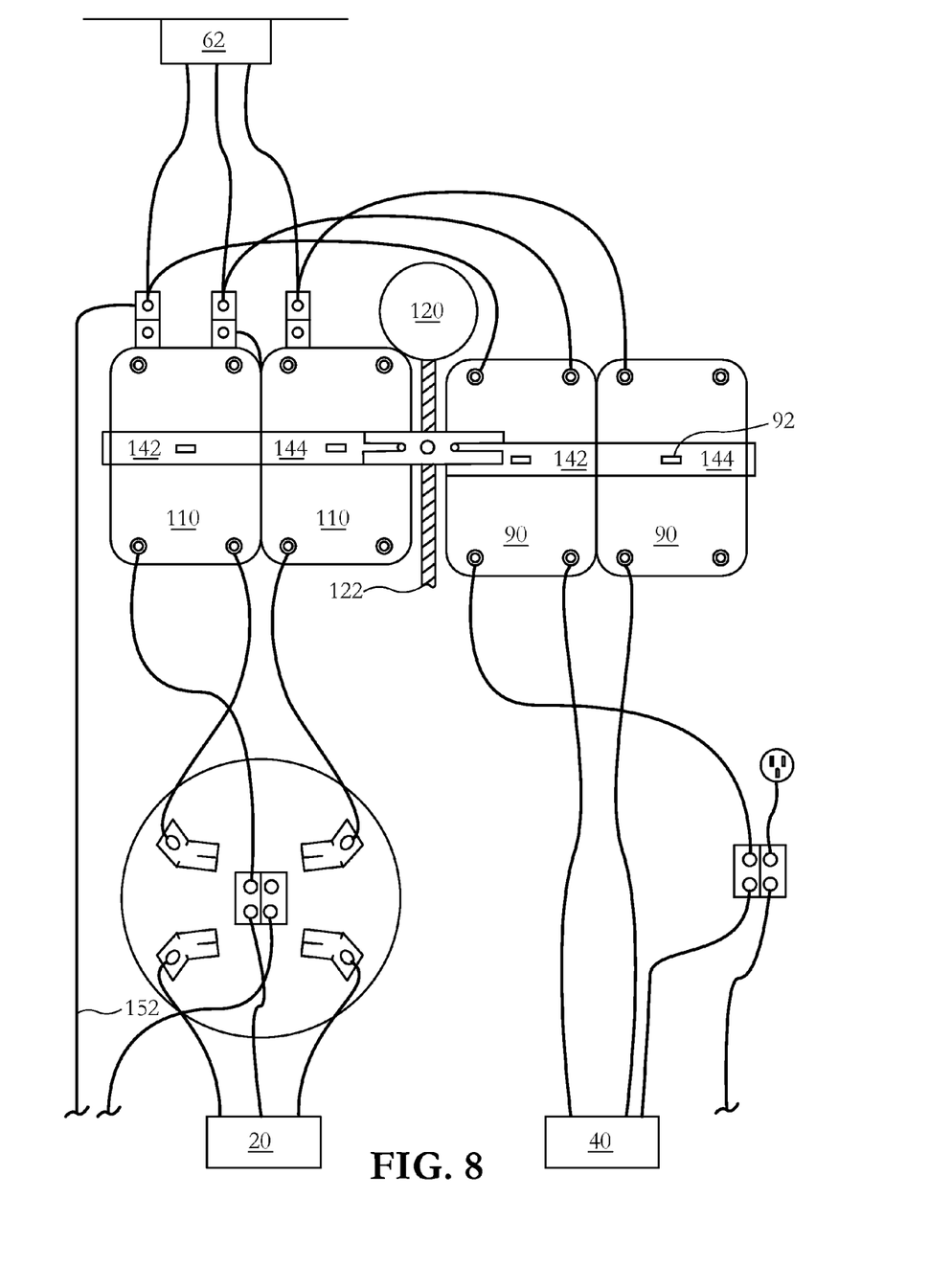
FIG. 8 is a diagram of a power system according to an embodiment of the invention where power supply is isolated.
Figure 9:
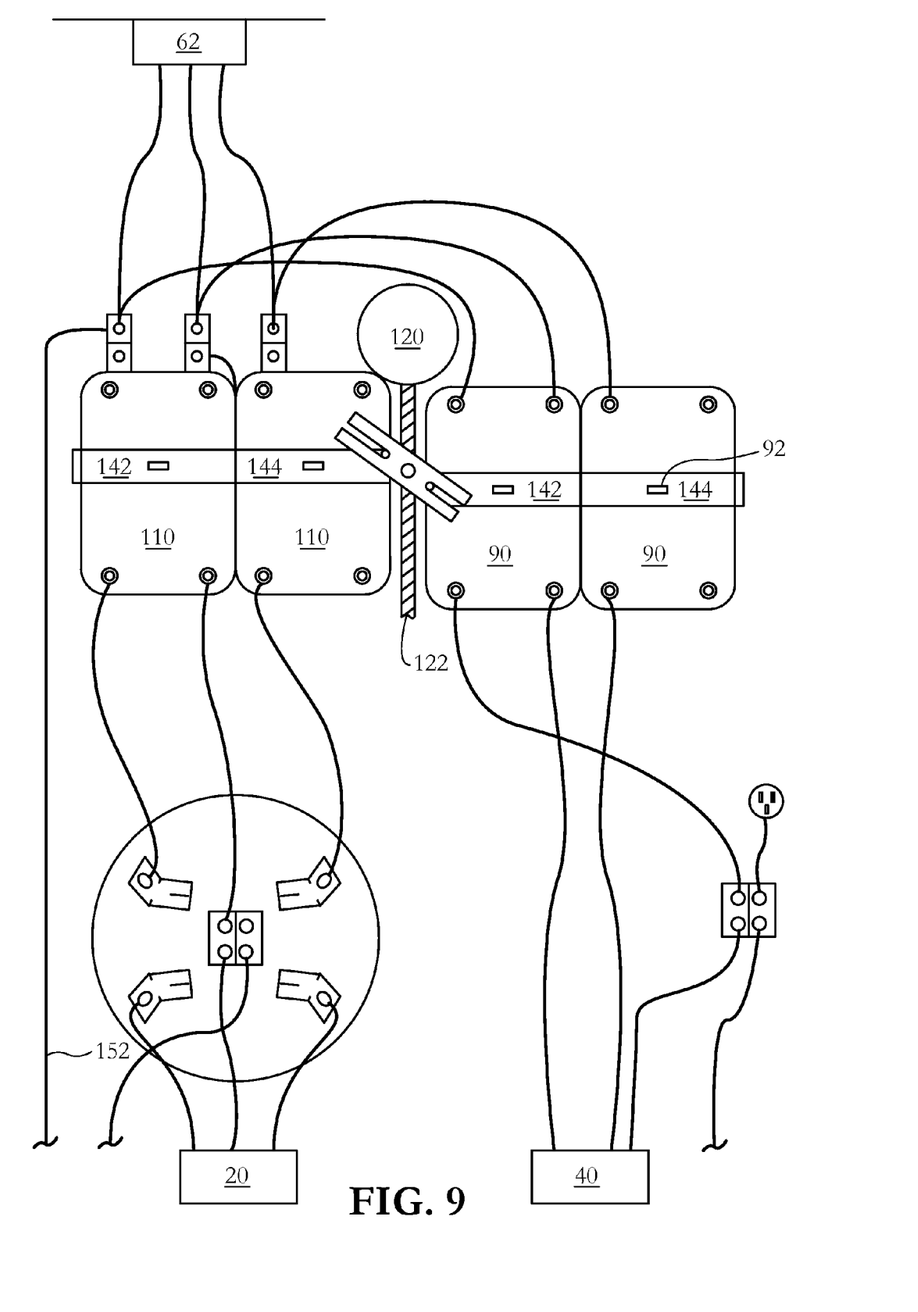
FIG. 9 is a diagram of a power system according to an embodiment of the invention where power is being supplied by a backup source.
Figure 10:
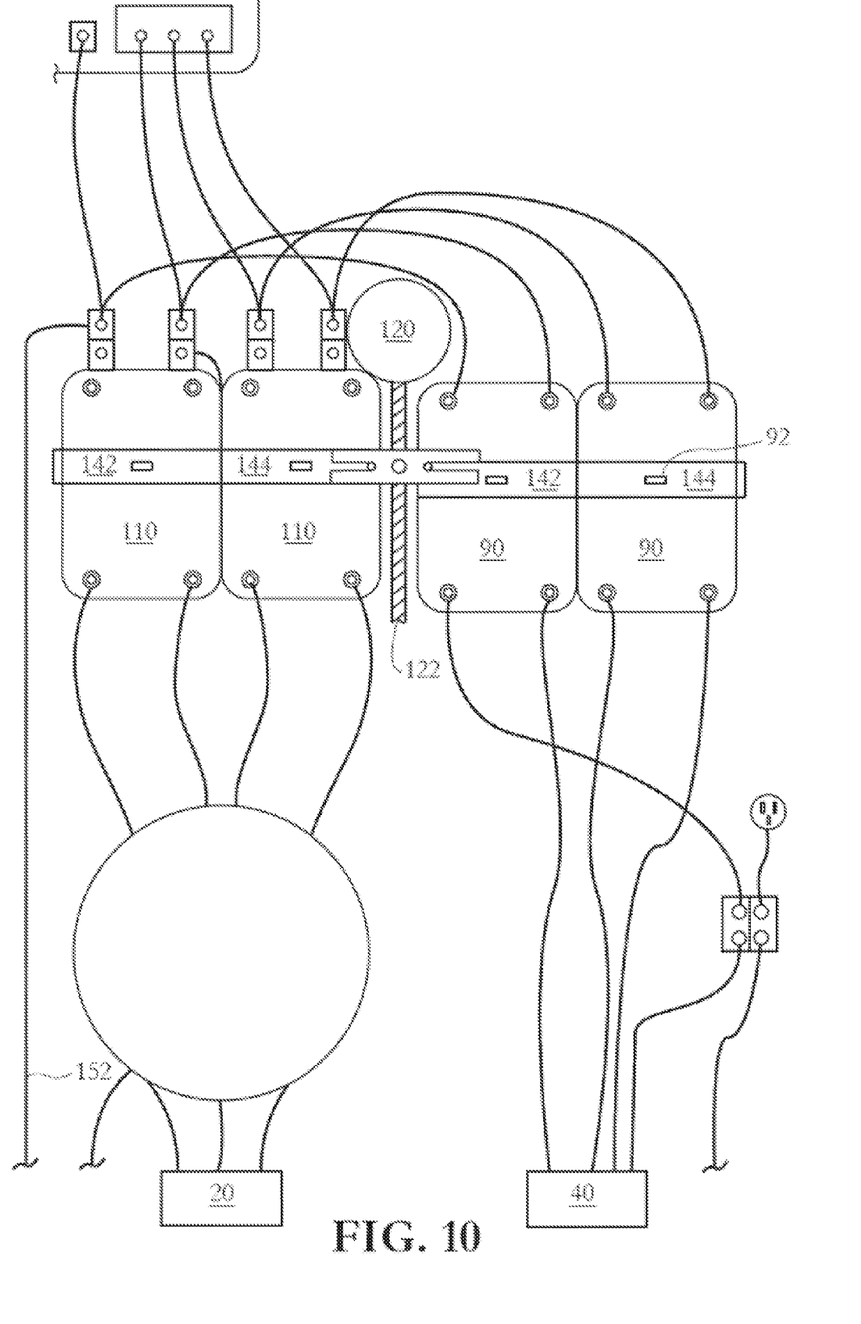
FIG. 10 is a diagram of a power system according to an alternate embodiment of the invention.

FIG. 7 shows the power system 10 in a first mode where the utility power is supplying power for the load center 62. FIG. 8 illustrates the entire power system 10 in the isolation mode where power supply is completely isolated from the load center 62. FIG. 9 shows the entire power system 10 where the alternative or backup power supply is powering the load center 62. FIG. 10 is an alternative embodiment showing the system 10 with additional terminals in use.

A reliable automatic power transfer device, for automatically adjusting the power supply is an improvement in the field, however, a device that automatically supplies backup power in the event of a utility power outage creates a dangerous situation for first responders in the case of an emergency. The first responders may expect that electricity has been isolated from the home when the utility power supply is disabled, however, an emergency power transfer device may provide a power supply. In an emergency response, time is often a factor and an emergency safety control may minimize the time required to address electrical issues. An emergency safety control on the automatic power transfer device addresses these and other problems.

Figure 4:
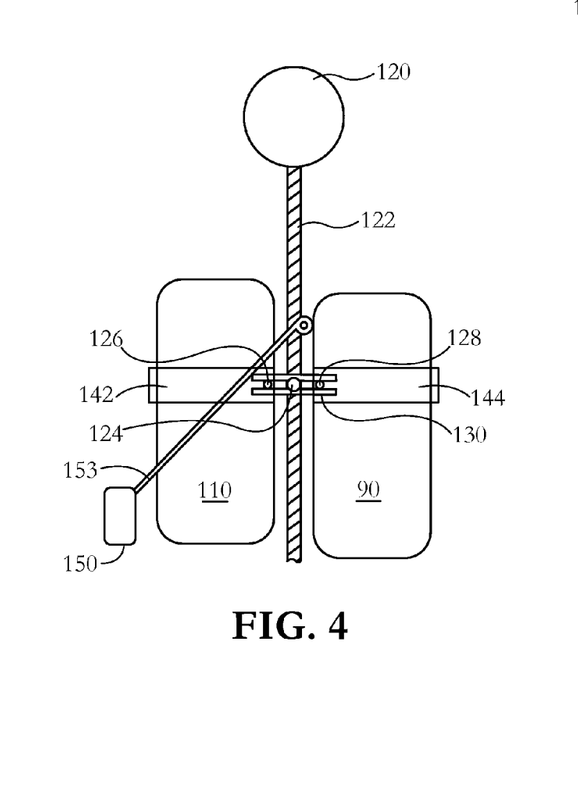
FIG. 4 is a diagram of an emergency isolation control according to an embodiment of the invention.

The emergency safety control 150, as seen in FIG. 4, is a manual control that may move the extensions 142, 144 to the isolation position (B) and also accomplishes disabling the automatic power transfer. Control 150 may accomplished this in a variety of ways. The control 150 may be, for example, located outside the home in an easily accessible location or may be in a close vicinity to the breakers. Either placement operates basically the same way in operation.

In one example, the control 150 may include an activation device, such as a handle or button and a sensor that, once engaged by the activation device, detects the position of the switches 94 on both circuit breakers and then powers the auger drive 122 accordingly to move the extensions to the B position (as seen in FIG. 2), isolating the breakers from both power supplies. The activation device may also include an override to disable the auger drive motor 120 so that the auger drive 122 is not activated to move the extensions to the A or B position.

In another example, the control 150 may include a handle that once activated, rotates a lock 153 that physically engages a portion of the extensions 142, 144, the alternating pivotal fulcrum or the bars 130 and moves the extensions 142, 144 to the B position. The lock 153 also prevents the repositioning of the switches so the circuit boards to not receive power from any available source.

Alternatively, once the activation device of the control 150 is triggered, the control may directly isolate the power supply from both utility and backup supply in other ways, such as acting directly to open the ground to both supplies.

Further, the control 150, may activate an alarm and alert system by connecting to or including a communication device and dialing 911 when directed, as well as, optionally turning on an alarm system which may include warning lights and siren or horn. The control may further notify the home or business owner or emergency personnel through electronic means, such as by email, or by phone. An emergency safety control may be manually activated, for example, by bystanders, the home owner, first responders or power service operators to alert emergency services to a problem and in order to provide a safe environment for first responders.

Certain modifications and improvements will occur to those skilled in the art upon a reading of the foregoing description. It should be understood that all such modifications and improvements have been deleted herein for the sake of conciseness and readability but are properly within the scope of the following claims.

For example, certain voltages are recited herein. Those of ordinary skill in the art will understand that equipment designed to handle other voltages is within the scope of the invention. Also, while the invention has been described as being made with circuit breakers, simple, non-current-limiting switches can be substituted. Also, for 3-pole power, the number of poles of the circuit or switch can be increased as needed.

What is claimed is:

1. A power transfer device comprising:
    a first multiple pole switch comprising:
        at least two pairs of opposing terminals; and
        a switch mechanism movable in a first direction to produce an electrical connection between the terminals of each pair;
    a second multiple pole switch comprising:
        at least two pairs of opposing terminals; and
        a switch mechanism movable in a second direction substantially opposite the first direction to produce an electrical connection between the terminals of each pair; and
    an extension at the switch mechanisms that moves the switch mechanisms in the same direction to open circuits of the first switch, while the circuits of the second switch remain open, followed by closing the circuits of the second switch while the first switch circuit remains open, with a period of time during extension movement that all of the electrical connections are open;
    electrical connections to each switch including a hot line and a ground line; and
    an electro-mechanical mechanism to enable movement of the extensions.

2. The device of claim 1 further including a safety control.

3. The device of claim 2 wherein the safety control includes an alert system.

4. The device of claim 1 wherein the extension includes a corner stop.

5. The device of claim 1 wherein the electro-mechanical mechanism includes an auger device.

6. The device of claim 5 wherein the auger device powers an alternating pivotal fulcrum to position the extensions and actuate the switches.

7. The device of claim 1 further comprising:
    a main power source;
    a power cable from the main power source connected to a terminal of one of the opposing pairs of terminals of the first switch;
    a power cable from the main power source connected to a terminal of the other one of the opposing pairs of terminals of the first switch; and
    a neutral or common cable from the main power source connected to one of the opposing pairs of terminals of the first switch.

8. The device of claim 7 further comprising:
    an electrical load;
    a cable from the electrical load connected to the other terminal of the pair to which the one of the power cables from the main power source is connected;
    a cable from the electrical load connected to the other terminal of the pair to which the other of the power cables from the main power source is connected; and
    a cable grounded at one end connected to the other terminal of the pair to which the neutral cable from the main power source is connected.

9. The device of claim 8 further comprising:
    an auxiliary power source;
    a power cable from the auxiliary power source connected to a terminal of one of the opposing pairs of terminals of the second switch;
    a power cable from the auxiliary power source connected to a terminal of one of the other opposing pairs of terminals of the second switch; and
    a neutral cable from the auxiliary power source connected to a terminal of one of the opposing pairs of terminals of the adjacent multiple pole switch.

10. The device of claim 9 further comprising:
    a cable connected at one end to the terminal of the circuit breaker opposing the terminal to which the neutral or common cable from the main power source is connected, and at its distal end to the terminal of the adjacent circuit breaker opposing the terminal to which the neutral or common cable from the auxiliary power source is connected;
    a cable connected at one end to one of the terminals of the circuit breaker opposing a terminal to which one of the power cables from the main power source is connected, and at its distal end to one of the terminals opposing a terminal of the adjacent circuit breaker to which one of the power cables from the auxiliary power source is connected; and
    a cable connected at one end to the other of the terminals of the circuit breaker opposing a terminal to which one of the power cables from the main power source is connected, and at its distal end to one of the terminals opposing a terminal of the adjacent circuit breaker to which the other of the power cables from auxiliary power source is connected.

11. The device of claim 1 wherein the first multiple pole switch has at least three pairs of opposing terminals; the second multiple pole switch has at least three pairs of opposing terminals; and the electrical connections to each switch include and a neutral.

12. An automatic isolation switch for a power transfer device comprising:
- a first switch and a second switch disposed with lateral sides adjacent one another, each switch having pairs of poles transversely opposing the lateral sides sufficient to convey power, neutral and ground as may be required by a power supply and each switch opening or closing for power, neutral and ground;
- a linkage between the first and second switches configured such that one switch may be closed while the other switch remains open;
- an electro-mechanical mechanism having an auger configured to power a pivotal fulcrum for positioning an extension about the switches for moving the switches independently between the open and closed positions.

* * * * *

UNITED STATES PATENT AND TRADEMARK OFFICE
CERTIFICATE OF CORRECTION

| | | |
|---|---|---|
| PATENT NO. | : 8,803,369 B1 | Page 1 of 1 |
| APPLICATION NO. | : 13/233493 | |
| DATED | : August 12, 2014 | |
| INVENTOR(S) | : Caudill | |

It is certified that error appears in the above-identified patent and that said Letters Patent is hereby corrected as shown below:

On the Title Page Item [56] should be inserted --3,778,633 to De Visser et al.--

In the Specification

Column 5, line 26, after the word switch, the "I" should be deleted

Column 7, line 11, the word --do-- should be inserted after the word boards

Signed and Sealed this
Fourteenth Day of October, 2014

Michelle K. Lee
*Deputy Director of the United States Patent and Trademark Office*